United States Patent
Kato

(10) Patent No.: US 8,102,462 B2
(45) Date of Patent: Jan. 24, 2012

(54) IMAGING DEVICE, FOCUSING METHOD AND PROGRAM

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/816,141

(22) Filed: Jun. 15, 2010

(65) Prior Publication Data

US 2010/0247084 A1    Sep. 30, 2010

Related U.S. Application Data

(60) Division of application No. 10/956,673, filed on Oct. 1, 2004, now abandoned, which is a continuation of application No. PCT/JP03/17029, filed on Dec. 26, 2003.

(30) Foreign Application Priority Data

Dec. 27, 2002 (JP) ................................. 2002-378833

(51) Int. Cl.
  H04N 5/232  (2006.01)
  H04N 5/235  (2006.01)
  H04N 5/222  (2006.01)
  B03B 13/00  (2006.01)
(52) U.S. Cl. ..................... 348/345; 348/362; 348/370
(58) Field of Classification Search .......... 348/370–371, 348/345–357, 362; 396/61
  See application file for complete search history.

(56) References Cited

U.S. PATENT DOCUMENTS

| | | | |
|---|---|---|---|
| 4,299,464 A | | 11/1981 | Cushman |
| 4,484,807 A | * | 11/1984 | Kataoka et al. ............... 396/157 |
| 4,771,307 A | * | 9/1988 | Kuno et al. .................... 396/98 |
| 4,792,819 A | * | 12/1988 | Akashi .......................... 396/104 |
| 5,227,828 A | * | 7/1993 | Kirigaya ....................... 396/103 |
| 5,231,447 A | | 7/1993 | Takagi |
| 5,737,647 A | * | 4/1998 | Nakajima et al. ............. 396/106 |

(Continued)

FOREIGN PATENT DOCUMENTS

JP    7-110433 A    4/1995

(Continued)

OTHER PUBLICATIONS

Japanese Office Action dated May 12, 2009 (2 pages), and English translation thereof (2 pages), issued in counterpart Japanese Application Serial No. 2002-378833.

(Continued)

Primary Examiner — Nhan T Tran
Assistant Examiner — Tuan Le
(74) Attorney, Agent, or Firm — Holtz, Holtz, Goodman & Chick, PC

(57) ABSTRACT

An image processing circuit/CPU performs AF processing in response to a halfway shutter operation and upon confirmation of a shooting shutter instruction causes a light emitting unit in a flash circuit to emit light, and decides an amount of light to be emitted at a shooting time based on a brightness component of an output signal of an imaging element, whereby a subject distance is calculated from the amount of light emitted at shooting time, and wherein, when the in-focus decision in the AF processing is negative, an optical lens is moved by a lens drive circuit to a position corresponding to the subject distance which has been acquired based on the amount of light emitted at the shooting time, and a shooting operation is then performed.

8 Claims, 4 Drawing Sheets

U.S. PATENT DOCUMENTS

| | | | |
|---|---|---|---|
| 6,154,612 A * | 11/2000 | Iwasaki | 396/61 |
| 6,327,434 B1 | 12/2001 | Okumura et al. | |
| 6,359,651 B1 | 3/2002 | Yokonuma | |
| 6,426,775 B1 * | 7/2002 | Kurokawa | 348/363 |
| 7,420,612 B2 | 9/2008 | Tsujino | |
| 2001/0004271 A1 * | 6/2001 | Konishi | 348/371 |
| 2001/0026324 A1 | 10/2001 | Saito et al. | |
| 2001/0050719 A1 | 12/2001 | Kobayashi et al. | |
| 2003/0169365 A1 | 9/2003 | Tojo | |
| 2004/0100573 A1 | 5/2004 | Nonaka | |

FOREIGN PATENT DOCUMENTS

| | | |
|---|---|---|
| JP | 11-275412 | 10/1999 |
| JP | 2000-267151 A | 9/2000 |
| JP | 2001-042396 A | 2/2001 |
| JP | 2001-257931 A | 9/2001 |
| JP | 2002-207159 | 7/2002 |
| JP | 2002-341235 A | 11/2002 |
| WO | WO 03/071789 A2 | 8/2003 |

OTHER PUBLICATIONS

European Patent Office Communication dated Jun. 3, 2009 (6 pages), issued in counterpart European Application Serial No. 03 768 362.0.

Japanese Office Action dated Feb. 3, 2009 (3 pages), and English translation thereof (4 pages), issued in counterpart Japanese Application Serial No. 2002-378833.

* cited by examiner

IMAGING DEVICE, FOCUSING METHOD AND PROGRAM

CROSS-REFERENCE TO RELATED APPLICATIONS

The present application is a Divisional Application of U.S. application Ser. No. 10/956,673 filed Oct. 1, 2004 now abandoned, which is a Continuation Application of PCT Application No. PCT/JP03/17029, filed Dec. 26, 2003, which was published under PCT Article 21(2) in English.

This application is based upon and claims the benefit of priority from prior Japanese Patent Application No. 2002-378833, filed Dec. 27, 2002, the entire contents of which are incorporated herein by reference.

BACKGROUND OF THE INVENTION

1. Field of the Invention

The present invention relates to an imaging device, a focusing method for use with the imaging device, and a program.

2. Description of the Related Art

At present, digital cameras and film-based cameras are mostly equipped with autofocusing (AF) mechanisms. Among the autofocus systems built into these cameras are a phase difference detection system which brings the camera into focus by detecting a difference in incident light between different positions and a contrast detection system which achieves focus by detecting the lens position at which the contrast of an image captured on a CCD or the like becomes maximized. In either of the AF systems, poorly lit subjects often make it impossible to detect the correct lens in-focus position. For this reason, with such a shooting environment, an assist light beam is emitted to improve the subject environment.

Even in the case where a subject is irradiated with the assist light beam as described above, however, in some instances the decision of the correct lens in-focus position becomes impossible due to lack of the amount of light or an erroneous decision is made. In particular, irrespective of an out-of-focus condition, the user may be erroneously notified that the camera has been brought into focus. That is, the user may take a picture without knowing that focus is not achieved.

The incorporation of an assist light irradiation device or parts into cameras would increase the cost and impose restrictions on the camera size and design. Additionally, a person as a subject might be dazzled during autofocusing.

BRIEF SUMMARY OF THE INVENTION

In one aspect of the invention, an imaging device having moving means for moving an optical system and decision means for deciding a position to which the optical system is to be moved by the moving means so that a subject is brought into focus, comprising: light emitting means; light control means which determines a proper amount of light at shooting time emitted by the light emitting means based on brightness of the subject when the light emitting means is caused to make preliminary emission; distance acquisition means which acquires a subject distance to the subject corresponding to the brightness of the subject when preliminary light emission is made by the light emitting means to allow the light control means to determine the proper amount of light; and control means which, when the decision means cannot decide the position to which the optical system is to be moved, controls the moving means so that the optical system is moved to the position corresponding to the subject distance acquired by the distance acquisition means.

In another aspect of the invention, the distance acquisition means in the imaging device acquires the subject distance based on the proper amount of light determined by the light control means.

In a further aspect of the invention, a focusing method for use with an imaging device having an autofocus function which decides the position to which an optical system is to be moved so that a subject is brought into focus and a light control function which determines the proper light emission time at shooting time of a light emission unit on the basis of the brightness of the subject when preliminary light emission is made and then causes the light emission unit to emit light only for the proper light emission time at shooting time, comprises: moving the optical system, when the position to which the optical system is to be moved cannot be decided by the autofocus function, to the position corresponding to the subject distance corresponding to the brightness of the subject when the light emission unit is caused to make preliminary light emission by the light control function.

In a still another aspect of the invention, a computer, for use with an imaging device having an autofocus function, which decides a position to which an optical system is to be moved so that a subject is brought into focus and a light control function which determines a proper light emission time at shooting time of a light emission unit based on brightness of the subject when preliminary light emission is made and then causes the light emission unit to emit light only for the proper light emission time at shooting time, operates on a program for causing the computer to perform a function as control means which, when the position to which the optical system is to be moved cannot be decided by the autofocus function, moves the optical system to the position corresponding to the subject distance corresponding to the brightness of the subject when the light emission unit is caused to make preliminary light emission by the light control function.

Accordingly, even under such dark shooting environments as the in-focus position of the optical system cannot be decided, the optical system is moved into the position corresponding to the subject distance corresponding to the brightness of the subject at preliminary light emission time. It therefore becomes possible to shoot the subject more sharply even under dark shooting environments, without losing easiness of use.

In the still further aspect of the invention, an imaging device having moving means for moving an optical system and decision means for deciding the position to which the optical system is to be moved by the moving means so that a subject is brought into focus, comprising: light emitting means; light control means which determines the proper amount of light at shooting time emitted by the light emitting means on the basis of the brightness of the subject when the light emitting means is caused to make preliminary emission; distance acquisition means which acquires the distance to the subject corresponding to the brightness of the subject when preliminary light emission is made by the light emitting means to allow the light control means to determine the proper amount of light; and nullifying means which, when the relationship between the position decided by the decision means and the position acquired by the distance acquisition means meets a predetermined condition, nullifies the decision by the decision means.

According to a further aspect of the invention, the distance acquisition means in the imaging device acquires the subject distance on the basis of the proper amount of light determined by the light control means.

According to a still further aspect of the invention, the nullifying means in the imaging device nullifies the position to which the optical system is to be moved decided by the decision means and changes the position to which the optical system is to be moved at shooting time to the position corresponding to the subject distance acquired by the distance acquisition means.

In a still further aspect of the invention, the predetermined condition defined in the imaging device is that the difference between the subject distance corresponding to the position to which the optical system is to be moved decided by the decision means and the subject distance acquired by the distance acquisition means is smaller than a predetermined value.

In a still further aspect of the invention, a focusing method for use with an imaging device having an autofocus function which decides the position to which an optical system is to be moved so that a subject is brought into focus and a light control function which determines the proper light emission time at shooting time of a light emission unit on the basis of the brightness of the subject when preliminary light emission is made and then causes the light emission unit to emit light at shooting time only for the proper light emission time, comprises: making a decision of whether or not the relationship between the subject distance corresponding to the position to which the optical system is to be moved decided by the autofocus function and the subject distance corresponding to the brightness of the subject when the light emission unit is caused by the light control function to make preliminary light emission meets a predetermined condition; and nullifying the position to which the optical system is to be moved decided by the autofocus function when the predetermined condition is met.

In a still further aspect of the invention, a computer for use with an imaging device having an autofocus function which decides the position to which an optical system is to be moved so that a subject is brought into focus and a light control function which determines the proper light emission time at shooting time of a light emission unit on the basis of the brightness of the subject when preliminary light emission is made and then causes the light emission unit to emit light at shooting time only for the proper light emission time, operates on a program for performing the functions of: making a decision of whether or not the relationship between the subject distance corresponding to the position to which the optical system is to be moved decided by the autofocus function and the subject distance corresponding to the brightness of the subject when the light emission unit is caused by the light control function to make preliminary light emission meets a predetermined condition; and nullifying the position to which the optical system is to be moved decided by the autofocus function when the predetermined condition is met.

Accordingly, when the position to which the optical system has been moved is greatly different from the in-focus position or the in-focus position is apparently wrong, the user is notified to that effect or the optical system is moved to the neighborhood of the in-focus position. It therefore becomes possible to shoot the subject more sharply even under dark shooting environments.

In a still further aspect of the invention, an imaging device having moving means for moving an optical system and decision means for deciding the position to which the optical system is to be moved by the moving means so that a subject is brought into focus, comprising: light emitting means; light control means which determines the proper amount of light at shooting time emitted by the light emitting means on the basis of the brightness of the subject when the light emitting means is caused to make preliminary light emission; distance acquisition means which acquires the distance to the subject corresponding to the brightness of the subject when preliminary light emission is made by the light emitting means; measurement means which measures the brightness of the subject under a shooting standby condition; and control means which, when the brightness of the subject measured by the measurement means is lower than a predetermined value, controls the moving means so that the optical system is moved to the position corresponding to the subject distance acquired by the distance acquisition means without depending on the decision means.

In a still further aspect of the invention, the distance acquisition means in the imaging device acquires the subject distance on the basis of the proper amount of light determined by the light control means.

In a still further aspect of the invention, a focusing method for use with an imaging device having an autofocus function which decides the position to which an optical system is to be moved so that a subject is brought into focus and a light control function which determines the proper light emission time at shooting time of a light emission unit on the basis of the brightness of the subject when preliminary light emission is made and then causes the light emission unit to emit light at shooting time only for the proper light emission time, comprising: measuring the brightness of the subject under a shooting standby condition; making a decision of whether or not the brightness of the subject measured by the measurement step is lower than a predetermined value; and moving the optical system at shooting time to the position corresponding to the subject distance corresponding to the brightness of the subject when the light emission means is caused to make preliminary light emission without depending on the autofocus function when the decision is that the brightness of the subject measured by the measurement step is lower than the predetermined value.

In a still further aspect of the invention, for use with an imaging device having an autofocus function which decides the position to which an optical system is to be moved so that a subject is brought into focus and a light control function which determines the proper light emission time at shooting time of a light emission unit on the basis of the brightness of the subject when preliminary light emission is made and then causes the light emission unit to emit light at shooting time only for the proper light emission time, a computer operates on a program for performing the functions of: measuring the brightness of the subject under a shooting standby condition; and moving the optical system at shooting time to the position corresponding to the subject distance corresponding to the brightness of the subject when the light emission means is caused to make preliminary light emission without depending on the autofocus function when the brightness of the subject is decided by the measuring function to be lower than a predetermined value.

Accordingly, when the brightness of the subject is lower than a predetermined value at shooting standby time, the optical system is moved to the neighborhood of the correct in-focus position at shooting time. It therefore becomes possible to shoot the subject more sharply even under dark shooting environments.

DETAILED DESCRIPTION OF THE INVENTION

The invention will be described hereinafter in terms of one specific application to an electronic still camera.

First Embodiment

Figure 1:
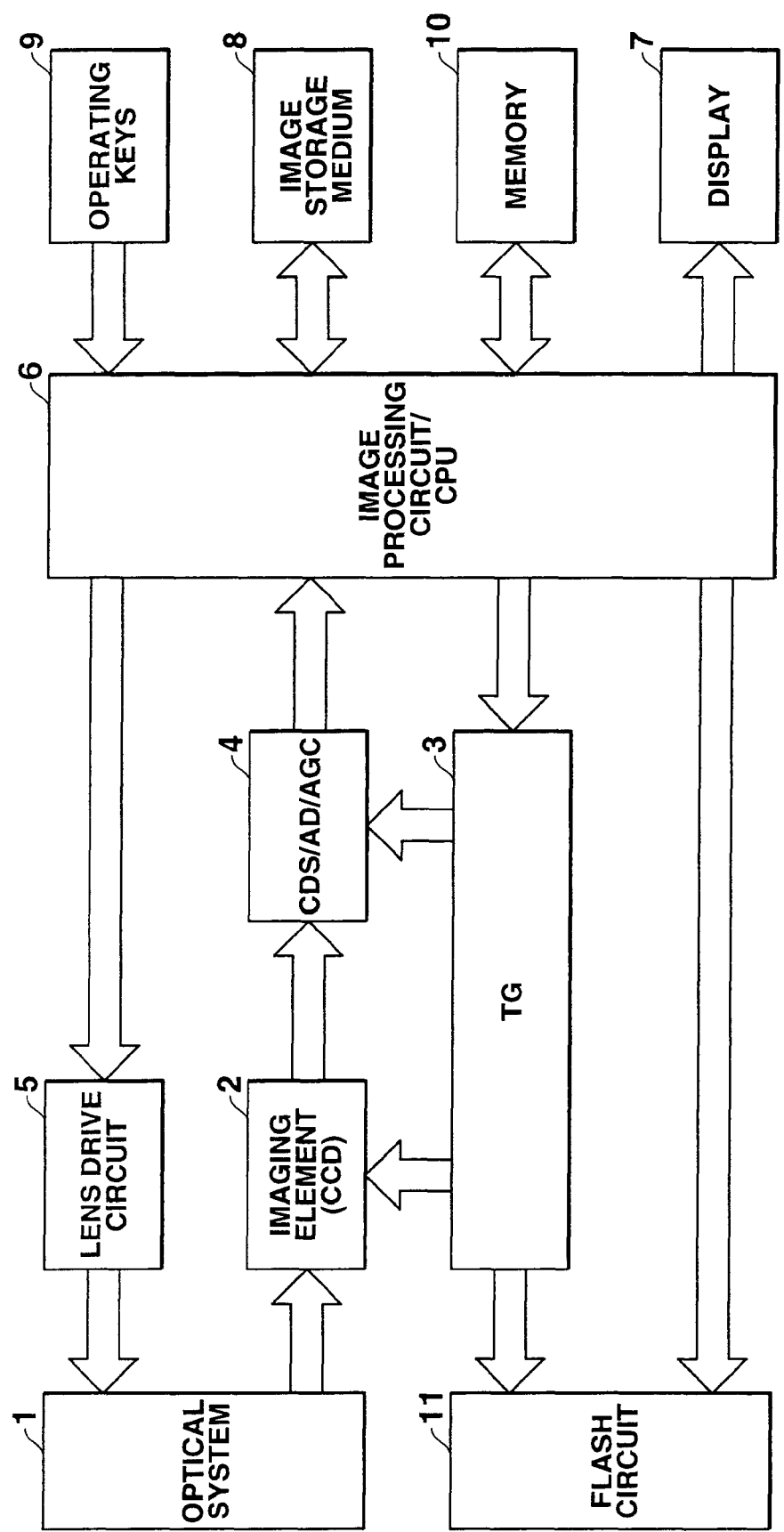
FIG. 1 is a block diagram of an imaging device according to one aspect of the present invention.

FIG. 1 is a block diagram of an electronic still camera for implementing the aspect of the present invention. This electronic still camera has an optical system 1 comprising a lens group including a focusing lens, a timing generator 3 for driving an imaging element 2, such as a CCD, onto which an image is formed by the optical system 1, and a unit circuit 4 which comprises a CDS which eliminates noise from an image signal output from the imaging element 2 through correlation double sampling and holds it, a gain control amplifier (AGC) which amplifies the image signal, and an analog-to-digital converter (AD) which converts the amplified image signal into a digital signal.

The focusing lens in the optical system 1 is held by a lens driving mechanism equipped with an AF motor. A lens driving circuit 5 drives the AF motor under control of an image processing circuit/CPU 6 to move the focusing lens along the optical axis and adjust the focus state of an image of a subject imaged onto the imaging element 2. At the time of AE control, the imaging element 2 is driven by the timing generator 3 on the basis of shutter pulses from the image processing circuit/CPU 6, so that its charge storage time is controlled. Thereby, an electronic shutter is implemented.

The image processing circuit/CPU 6, which has various signal and image processing functions, produces a video signal from the digital image signal output from the unit circuit 4 to display the subject image captured on the imaging element 2 as a through image on a display unit 7, such as a TFT liquid crystal monitor. At shooting time, the image signal is compressed to create an image file of a given format. The resulting image file is stored into an image storage medium 8, such as a flash memory. At image reproduction time, the compressed image file is expanded and then displayed on the display 7.

To the image processing circuit/CPU 6 are connected an operating key unit 9 provided with various operating keys including a shutter key, a memory 10, and an electronic flash circuit 11. The memory 10 is a program ROM stored with processing programs necessary for control and data processing by the image processing circuit/CPU 6. In this circuit configuration, the program ROM is stored with programs for causing the image processing circuit/CPU 6 to function as a light control unit, a distance acquisition unit, and a control unit.

The flash circuit 11 is equipped with a xenon lamp as a light emitting unit. A fire signal is sent from the image processing circuit/CPU 6 through the timing generator 3 to the flash circuit 11. The light emitting unit is fired to emit light only during the interval of time when the fire signal is being output. The amount of light emitted by the light emitting unit is proportional to the light emission time duration. The image of a subject on exposure to a flash of light is captured through the optical system 1 onto the imaging element 2, which outputs an image signal. The image signal output from the imaging element 2 is subjected to sampling, amplification, and digitization in the unit circuit 4 and then sent to the image processing circuit/CPU 6. In the image processing circuit/CPU 6, after conversion of the image signal into brightness information, the light emission time duration at the time of shooting is calculated. At the time of shooting, a fire signal is sent to the flash circuit 11 only during the calculated interval of time. That is, TTL (through the lens)-based light control is performed.

The memory 10 may be one in which stored data, such as programs, can be rewritten as required. Further, part of the programs and data may be stored into the image storage medium 8.

Figure 2:
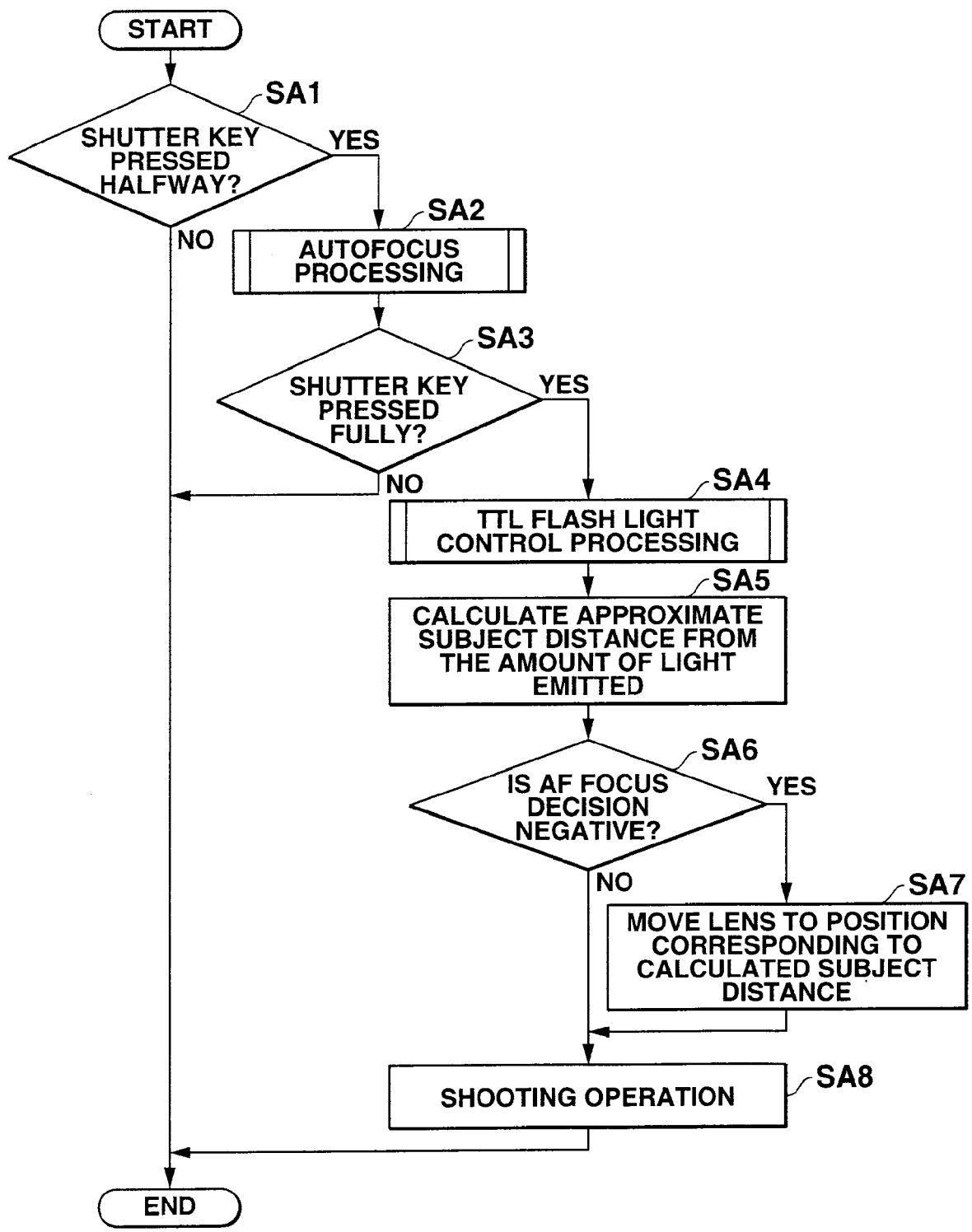
FIG. 2 is a flowchart illustrating the operation according to a first embodiment of the present invention.

Next, the operation at shooting time of the electronic still camera thus configured will be described with reference to a flowchart shown in FIG. 2. This flowchart illustrates the operation when the capture mode (shooting mode) is selected in dark shooting environments, such as non-illuminated outdoors at night.

When the shutter key is pressed halfway (YES in step SA1), the electronic still camera carries out autofocus processing based on the contrast detection scheme, in which the lens drive circuit 5 drives the AF motor to move the focusing lens into the position (in-focus position) where contrast is decided to be the highest on the basis of high-frequency components of contours in an image captured on the imaging element 2 (step SA2). The autofocus processing here may be performed on the basis of the phase difference detection scheme. In either scheme, assist light may be used. When the in-focus position of the lens is not obtained due to shortness of the amount of light from the subject, the AF focus decision process is handled as negative.

Subsequent to the autofocus processing, when the shutter key has been fully pressed and a shutter instruction for shooting has been confirmed (YES in step SA3), the flash light emission time duration (the amount of light emitted) at shooting time is calculated through TTL flash light control processing (step SA4). The light emission time duration (the amount of light emitted) is calculated here in the following manner by way of an example. That is, preliminary light emission is performed twice using flashes of light of T1 and T2 in duration (light emission time). At the time of preliminary light emission, the highest brightness values in histograms (the histogram peak values: HisPeakT1, HisPeakT2) are calculated using digital signals (image signals) sent from the imaging element 2 via the unit circuit 4. Next, using the peak values HispeakT1, HisPeakT2, and time data T1, and T2, the rate, TestRatio, of change of histogram peak values with respect to change of duration is calculated by $$\text{TestRatio} = (\text{HisPeak}T2)/\text{HisPeak}T1)/(T2/T1) \tag{1}$$

Further, the light emission time at shooting time, SetTime, that allows the histogram peak value HisPeakT1 in the first preliminary light emission of duration T1 to change to a predetermined target peak value PeakTarget is calculated by $$\text{SetTime} = T1 \times (1/\text{TestRatio}) \times \text{PeakTarget}/\text{HisPeak}T1 \tag{2}$$

This value is set as the duration of a flash of light at shooting time.

Subsequently, the distance, Dstrobo, to the subject is calculated from the calculated duration of a flash of light at shooting time, i.e., the amount of flashlight, and then temporarily stored in a buffer (step SA5). When the duration is of the order of 1000 msec or more, since the flashgun will emit all the light available, the distance, Dstrobe, is calculated from the guide number G of the flash unit and the aperture setting F by $$Dstrobe = G/F(m) \tag{3}$$

For example, with G=7 and F=2.8, the distance Dstrobe=2.5 m. The distance to the subject need not necessarily be determined through calculations. For example, the distance may be obtained by measuring a duration versus distance relationship in advance, storing the measured data in the form of a table, and reading from the table the distance corresponding to the emission time (duration) calculated in the TTL flashlight control processing in step SA4.

Next, if, regardless of the presence or absence of assist light, the AF focus decision is affirmative (NO in step SA6) as the result of the autofocus processing in step SA2, then a shooting operation is performed as it is (step SA8). In this step, image data captured by the imaging element 2 is compressed and then recorded on the image storage medium 8. If, on the other hand, the AF focus decision is negative (YES in step SA6), the focusing lens is moved into the position corresponding to the distance calculated subsequent to the TTL flashlight control processing (step SA7) and a shooting operation is then performed to record an image (step SA8).

According to this embodiment, therefore, when the in-focus position cannot be decided through the autofocusing operation based on the phase difference or contrast detection scheme disadvantageous to a subject in dark environments, the focus state of an image to be shot can be changed from out-of-focus state to in-focus state by setting the lens to the distance decided (calculated) by the TTL flashlight control processing. Moreover, no device or part for emitting assist light is required in autofocusing operations based on the contrast or phase difference detection scheme. As the result, the above utility can be obtained without causing inconvenience to manufacture of the electronic still camera and lowering handiness thereof.

Although, in step SA5, the approximate distance to the subject is calculated from the duration of flashlight calculated in the TTL flashlight control processing, this is not restrictive. For example, with cameras designed such that the flash circuit 11 is configured to be able to adjust the intensity of light emitting means and, in the TTL flashlight control processing, the intensity of flashlight is calculated rather than the duration and the calculated intensity is set as the intensity of the light emitting unit to thereby ensure the proper amount of flashlight at shooting time, the calculation of the approximate distance to the subject in step SA5 may be made based on the intensity of flashlight calculated in the TTL flashlight control processing.

Further, at the time of preliminary light emission with a predetermined amount of light, the approximate subject distance may be directly calculated from brightness information contained in a digital signal output from the imaging element 2 through the unit circuit 4, namely, the brightness of a subject captured. It is also possible to measure a subject brightness versus subject distance relationship in advance, store the measured data in the form of a table, and, in step SA5, read from the table the subject distance corresponding to the subject brightness detected at preliminary light emission time in the TTL flashlight control processing. In this case, it is not necessarily required to perform preliminary light emission twice as in the present embodiment; that is, the preliminary light emission may be made only once. In the case where preliminary light emission is made twice, the subject distance may be obtained from the subject brightness detected at the time of either the first or second light emission. Moreover, two tables such as of the type described above may be provided in correspondence with different amounts of emitted light at the time of preliminary light emission. In this case, two subject distances are obtained from the two different tables after two-time preliminary light emission and then averaged to get the approximate subject distance.

Second Embodiment

Figure 3:
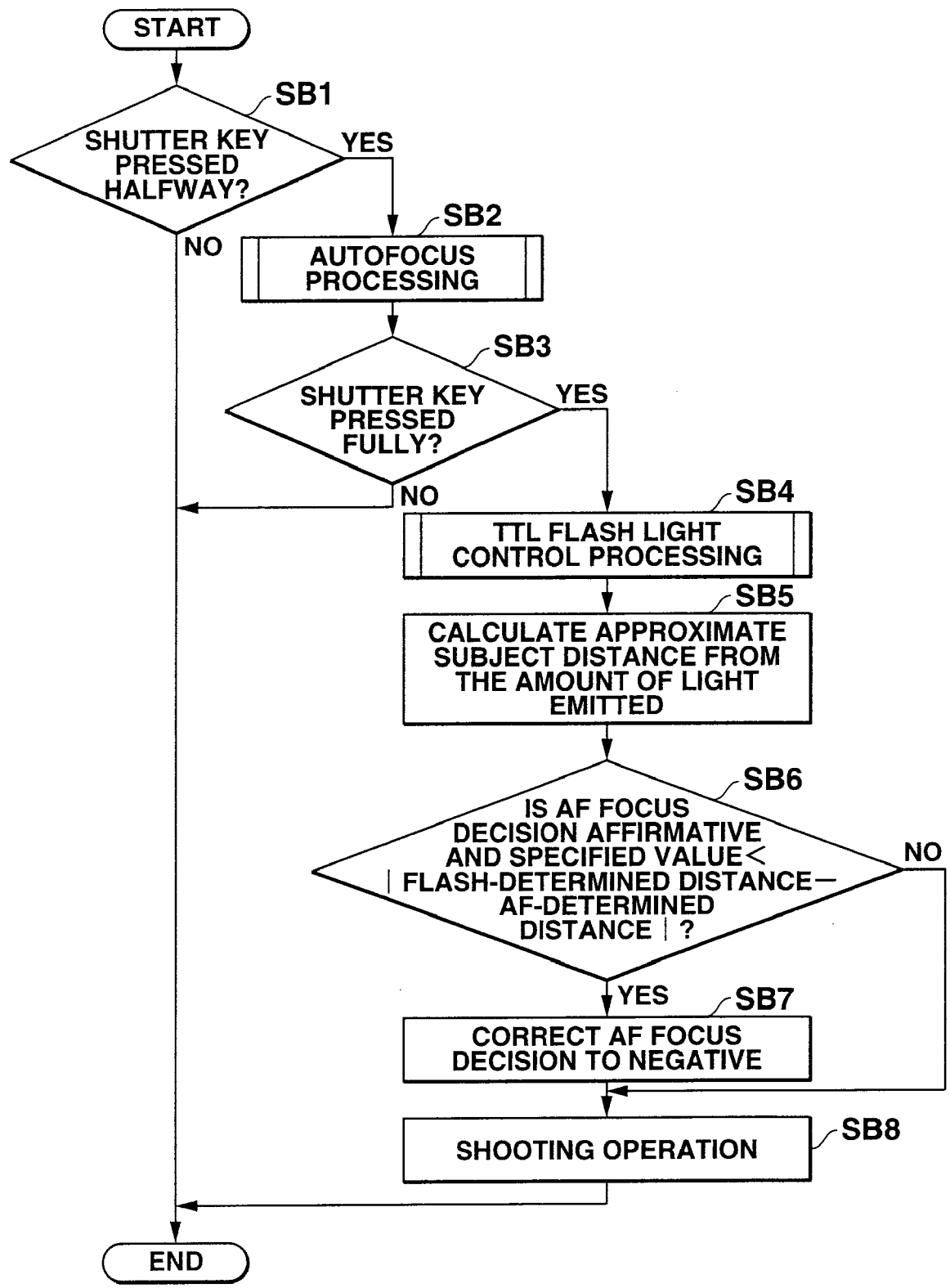
FIG. 3 is a flowchart illustrating the operation according to a second embodiment of the present invention.

Next, a second embodiment of the present invention will be described with reference to a flowchart of FIG. 3 which illustrates the operation at shooting time of the electronic still camera. In this embodiment as well, when the shutter key is pressed halfway (step SB1), the electronic still camera carries out autofocus processing (step SB2). When the shutter key is pressed fully and a shooting shutter instruction is confirmed (YES in step SB3), the duration of flashlight (the amount of flashlight) at shooting time is calculated through the TTL flashlight control processing (step SB4) and the subject distance is calculated based on the calculated duration and then temporarily stored (step SB5). The processes up to this point are the same as in the first embodiment of FIG. 2. In the autofocus processing, however, the subject distance is calculated in accordance with the procedure that confirms to an autofocusing scheme used. For example, with the contrast detection system, the distance is calculated based on the position of the focusing lens.

Next, when the AF focus decision is affirmative in the autofocus processing in step SB2 irrespective of the presence or absence of assist light, but the absolute value of the difference between the subject distance obtained in the autofocus processing and the subject distance calculated in step SB5 (the distance calculated through the TTL flashlight control processing) is larger than a specified value (YES in step SB6), the AF focus decision in the autofocus processing is considered to be in error. Therefore, the focus decision is changed from affirmative to negative with an appropriate message or mark displayed on the display 7 (step SB7). After that, a shooting process is carried out (step SB8). If the determination in step SB6 indicates NO, then the shooting process is performed as usual (step SB8).

As described above, when the focus decision in the phase-difference or contrast-based autofocus processing has been made in error due to the subject being dark, i.e., the decision is that focus has been achieved, the present embodiment allows the wrong decision to be corrected and the user to be notified that the image is out of focus. Thus, it becomes possible to prompt the user to take a picture once more or to manually take the focus. As the result, the user is allowed to record a sharply focused image. In the present embodiment as well, no device or part for emitting assist light is required in the autofocus processing based on the contrast detection or phase difference scheme. As the result, the above utility can be obtained without causing inconvenience to manufacture of the electronic still camera and lowering handiness thereof.

The present embodiment is configured such that, when the focus decision in the autofocus processing is considered to be in error, a message or mark to that effect is displayed on the display 7 in step SB7; however, this is not restrictive. For example, the process in step SB7 may be modified so as to, when there are some positions where the focusing lens is brought into focus as the result of a decision in the autofocus processing, correct the position of the lens with an intermediate distance as the subject distance, or automatically switch the shooting mode into one in which no AF operation is performed, or nullify the shooting operation (shutter operation) and cancel the shooting process with the aforementioned message or mark displayed. It is also possible to perform the same process as in step SA7 in the first embodiment described previously.

Although, in the second embodiment as well, the approximate subject distance is calculated from the duration at shooting time of flashlight calculated in the TTL flashlight control processing (step SB5), it may be acquired by the methods described as alternative methods in the first embodiment.

Third Embodiment

Figure 4:
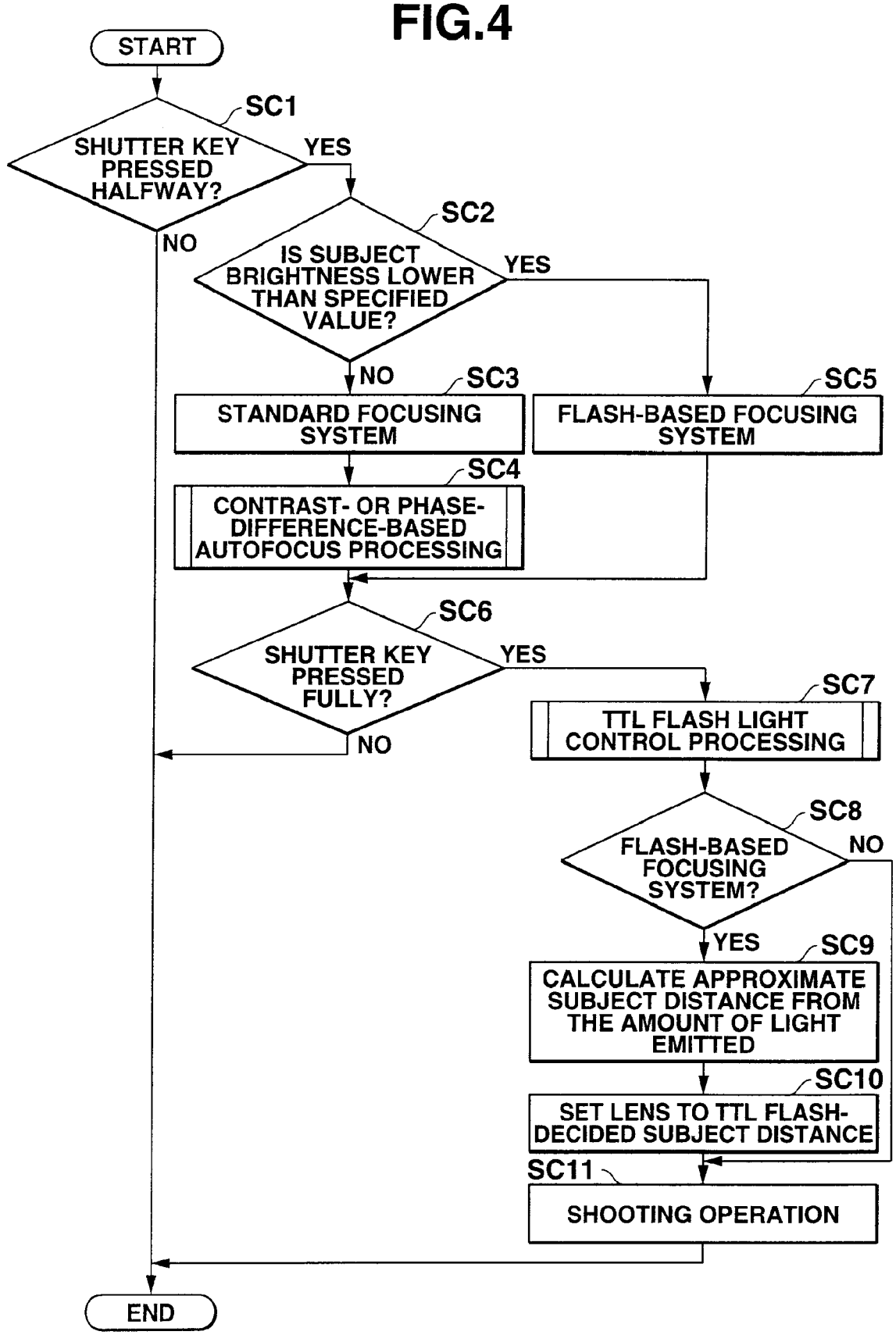
FIG. 4 is a flowchart illustrating the operation according to a third embodiment of the present invention.

A third embodiment of the present invention will be described next. In this embodiment, the memory 10 is stored with a program which allows the image processing circuit/CPU 6 to function as a measurement unit. Hereinafter, the operation at the shooting-time of the electronic still camera according to the third embodiment will be described with reference to a flowchart of FIG. 4.

In this embodiment, when the shutter key is pressed halfway (step SC1), the electronic still camera drives the imaging element 2, then measures the brightness of a subject on the basis of a signal digitized in the unit circuit 4 after being output from the imaging element 2 and makes a decision of whether or not the measured brightness is greater than a specified value (step SC2). If the measured brightness is greater than the specified value (NO in step SC2), the AF flag is set to indicate the standard system (step SC3) and then contrast- or phase-difference-based autofocus processing is carried out as usual (step SC4). If, on the other hand, the decision in step S2 indicates YES, then the AF flag is set to indicate the flash system (step SC5).

When the shutter key has been fully pressed and a shutter instruction for shooting has been confirmed (YES in step SC6), the duration of flash light (the amount of light emitted) at shooting time is calculated through TTL flash light control processing as in the case of the first and second embodiments (step SC7). After that, if the AF flag has been set to the standard system (NO in step SC8), a shooting operation is carried out as it is (step SC11). If, on the other hand, the flag has been set to the flash system (YES in step SC8), then the distance to the subject is calculated in step SC9 based on the duration of flashlight already calculated in step SC7 and the focusing lens is moved into the position corresponding to the calculated distance (step SC10). A shooting operation is then carried out (step SC11).

According to the third embodiment, as described above, when the subject is very dark and hence the conventional contrast- or phase-difference-based autofocusing scheme is not able to correctly decide whether focus has been achieved, the AF system is set to the flash-based system and the position of the focusing lens is controlled based on the distance calculated using the TTL flash function. Therefore, the accuracy of the autofocusing operation under shooting environments in which the brightness of subjects is extremely low can be improved. Additionally, since focus can be achieved in extremely dark spots without assist light, the above utility can be obtained without causing inconvenience to manufacture of the electronic still camera and lowering handiness thereof.

Although, in the third embodiment as well, the approximate subject distance is calculated from the duration at shooting time of flashlight calculated in the TTL flashlight control processing (step SC9), it may be acquired by the methods described as alternative methods in the first embodiment.

Although the embodiments of the invention has been described mainly in terms of an application to an electronic still camera, the principles of the invention is also applicable to a film-based camera provided that it has an autofocus function based on the contrast detection system or the phase difference system and a light control function to control the amount of flashlight at shooting time through the TTL system.

What is claimed is:

1. An imaging device comprising:
an imaging element;
moving means for moving an optical system;
decision means for deciding a position to which the optical system is to be moved by the moving means so that a subject is brought into focus, based on a contrast of an image captured by the imaging element;
means for storing an image captured by the imaging element when the optical system is moved to the position decided by the deciding means;
light emitting means for emitting light;
light control means for determining a proper amount of light at a shooting time to be emitted by the light emitting means, based on a brightness of the subject when the light emitting means is caused to make a preliminary light emission;
distance acquisition means for acquiring a subject distance to the subject corresponding to the brightness of the subject when the preliminary light emission is made by the light emitting means to allow the light control means to determine the proper amount of light; and
nullifying means for nullifying the decision by the decision means when a relationship between the position decided by the decision means and the subject distance acquired by the distance acquisition means meets a predetermined condition.

2. An imaging device according to claim 1, wherein the distance acquisition means acquires the subject distance based on the proper amount of light determined by the light control means.

3. An imaging device according to claim 2, wherein the nullifying means nullifies the position to which the optical system is to be moved decided by the decision means and changes the position to which the optical system is to be moved at the shooting time to a position corresponding to the subject distance acquired by the distance acquisition means.

4. An imaging device according to claim 2, wherein the predetermined condition is that a difference between a subject distance corresponding to the position to which the optical system is to be moved decided by the decision means and the subject distance acquired by the distance acquisition means is smaller than a predetermined value.

5. An imaging device according to claim 1, wherein the nullifying means nullifies the position to which the optical system is to be moved decided by the decision means and changes the position to which the optical system is to be moved at the shooting time to a position corresponding to the subject distance acquired by the distance acquisition means.

6. An imaging device according to claim 1, wherein the predetermined condition is that a difference between a subject distance corresponding to the position to which the optical system is to be moved decided by the decision means and the subject distance acquired by the distance acquisition means is smaller than a predetermined value.

7. A focusing method for use with an imaging device having an autofocus function which decides a position to which an optical system is to be moved so that a subject is brought into focus based on a contrast of an image captured by an imaging element, an image storing function which stores an image captured by the imaging element when the optical system is moved to the position decided by the autofocus function, and a light control function which determines a proper light emission time at a shooting time of a light emission unit based on a brightness of the subject captured by the imaging element when a preliminary light emission is made and then causes the light emission unit to emit light at the shooting time only for the proper light emission time, the focusing method comprising:

deciding whether a relationship between a subject distance corresponding to the position to which the optical system is to be moved decided by the autofocus function and a subject distance corresponding to the brightness of the subject when the light emission unit is caused by the light control function to make the preliminary light emission meets a predetermined condition; and nullifying the position to which the optical system is to be moved decided by the autofocus function when the predetermined condition is met.

8. A non-transitory computer readable storage medium having a program stored thereon for controlling an imaging device having an autofocus function which decides a position to which an optical system is to be moved so that a subject is brought into focus based on a contrast of an image captured by an imaging element, an image storing function which stores an image captured by the imaging element when the optical system is moved to the position decided by the autofocus function, and a light control function which determines a proper light emission time at a shooting time of a light emission unit based on a brightness of the subject captured by the imaging element when a preliminary light emission is made and then causes the light emission unit to emit light at the shooting time only for the proper light emission time, the program controlling the imaging device to perform functions comprising:

deciding whether a relationship between a subject distance corresponding to the position to which the optical system is to be moved decided by the autofocus function and a subject distance corresponding to a brightness of the subject when the light emission unit is caused by the light control function to make the preliminary light emission meets a predetermined condition; and nullifying the position to which the optical system is to be moved decided by the autofocus function when the predetermined condition is met.

\* \* \* \* \*